(12) United States Patent
Yoneyama

(10) Patent No.: US 8,878,940 B2
(45) Date of Patent: Nov. 4, 2014

(54) TRACKING APPARATUS FOR TRACKING TARGET SUBJECT IN INPUT IMAGE

(71) Applicant: Olympus Imaging Corp., Tokyo (JP)

(72) Inventor: Hisashi Yoneyama, Hachioji (JP)

(73) Assignee: Olympus Imaging Corp. (JP)

( * ) Notice: Subject to any disclaimer, the term of this patent is extended or adjusted under 35 U.S.C. 154(b) by 45 days.

(21) Appl. No.: 13/729,988

(22) Filed: Dec. 28, 2012

(65) Prior Publication Data

US 2013/0113941 A1 May 9, 2013

Related U.S. Application Data

(63) Continuation of application No. PCT/JP2012/062940, filed on May 21, 2012.

(30) Foreign Application Priority Data

Jun. 29, 2011 (JP) ................................ 2011-144769

(51) Int. Cl.
*G06K 9/00* (2006.01)
*H04N 5/232* (2006.01)

(52) U.S. Cl.
CPC ............ *H04N 5/232* (2013.01); *G06K 9/00221* (2013.01); *H04N 5/23219* (2013.01)
USPC ........................................................ 348/169

(58) Field of Classification Search
USPC ........................................................ 348/169
See application file for complete search history.

(56) References Cited

U.S. PATENT DOCUMENTS

| 6,078,720 | A  | * | 6/2000  | Lee et al. ....................... 386/279 |
| 6,542,625 | B1 | * | 4/2003  | Lee et al. ....................... 382/118 |
| 6,674,488 | B1 | * | 1/2004  | Satoh ............................. 348/663 |
| 7,990,476 | B2 | * | 8/2011  | Lee ................................ 348/699 |
| 8,253,800 | B2 | * | 8/2012  | Takeuchi et al. ............... 348/169 |
| 8,331,715 | B2 | * | 12/2012 | Steinberg et al. ............. 382/255 |
| 8,364,003 | B2 | * | 1/2013  | Hirata ............................ 386/349 |
| 2004/0130626 | A1 | * | 7/2004  | Ouchi et al. ................ 348/207.1 |
| 2005/0196015 | A1 | * | 9/2005  | Luo et al. ....................... 382/103 |

(Continued)

FOREIGN PATENT DOCUMENTS

| JP | 4506779 B2   | 7/2010 |
| JP | 2011-029759 A | 2/2011 |

(Continued)

OTHER PUBLICATIONS

International Search Report of International Application No. PCT/JP2012/062940 dated Jul. 31, 2012 consisting of 3 pages (PCT/ISA/210).

(Continued)

*Primary Examiner* — Chikaodili E Anyikire
*Assistant Examiner* — Leron Beck
(74) *Attorney, Agent, or Firm* — Volpe and Koenig, P.C.

(57) ABSTRACT

The tracking target subject specifying unit specifies a tracking target subject in image data. The first tracking position detection unit detects first characteristic information from the image data and set a first candidate tracking position based on the first characteristic information. The second tracking position detection unit detects second characteristic information from the image data and detect a second candidate tracking position based on the second characteristic information. The reference information acquisition unit acquires reference information. The control unit decides a true tracking position based on two determinations.

5 Claims, 9 Drawing Sheets

(56) References Cited

U.S. PATENT DOCUMENTS

| | | | |
|---|---|---|---|
| 2007/0013791 A1* | 1/2007 | Kinoshita et al. | 348/239 |
| 2010/0033554 A1* | 2/2010 | Kobayashi | 348/43 |
| 2010/0141772 A1* | 6/2010 | Inaguma et al. | 348/169 |
| 2011/0043639 A1* | 2/2011 | Yokohata | 348/169 |
| 2011/0285608 A1* | 11/2011 | Shen | 345/3.1 |
| 2012/0162633 A1* | 6/2012 | Roberts et al. | 356/5.09 |
| 2013/0058532 A1* | 3/2013 | White et al. | 382/103 |

FOREIGN PATENT DOCUMENTS

| | | |
|---|---|---|
| JP | 2011-035765 A | 2/2011 |
| JP | 2011-044764 A | 3/2011 |
| JP | 2011-071925 A | 4/2011 |
| WO | 2010/073619 A1 | 7/2010 |

OTHER PUBLICATIONS

Written Opnion of International Application No. PCT/JP2012/062940 dated Jul. 31, 2012 consisting of 4 pages (PCT/ISA/237).

English translation of International Search Report in corresponding Japanese Patent Application No. PCT/JP2012/062940 dated Jul. 31, 2012 consisting of 2 pages.

English translation of Written Opinion in corresponding Japanese Patent Application No. PCT/JP2012/062940 dated Jul. 31, 2012 consisting of 4 pages.

English translation of International Preliminary Report on Patentability issued in corresponding International Patent Application No. PCT/JP2012/062940 dated Jan. 16, 2014 consisting of 6 pages.

* cited by examiner

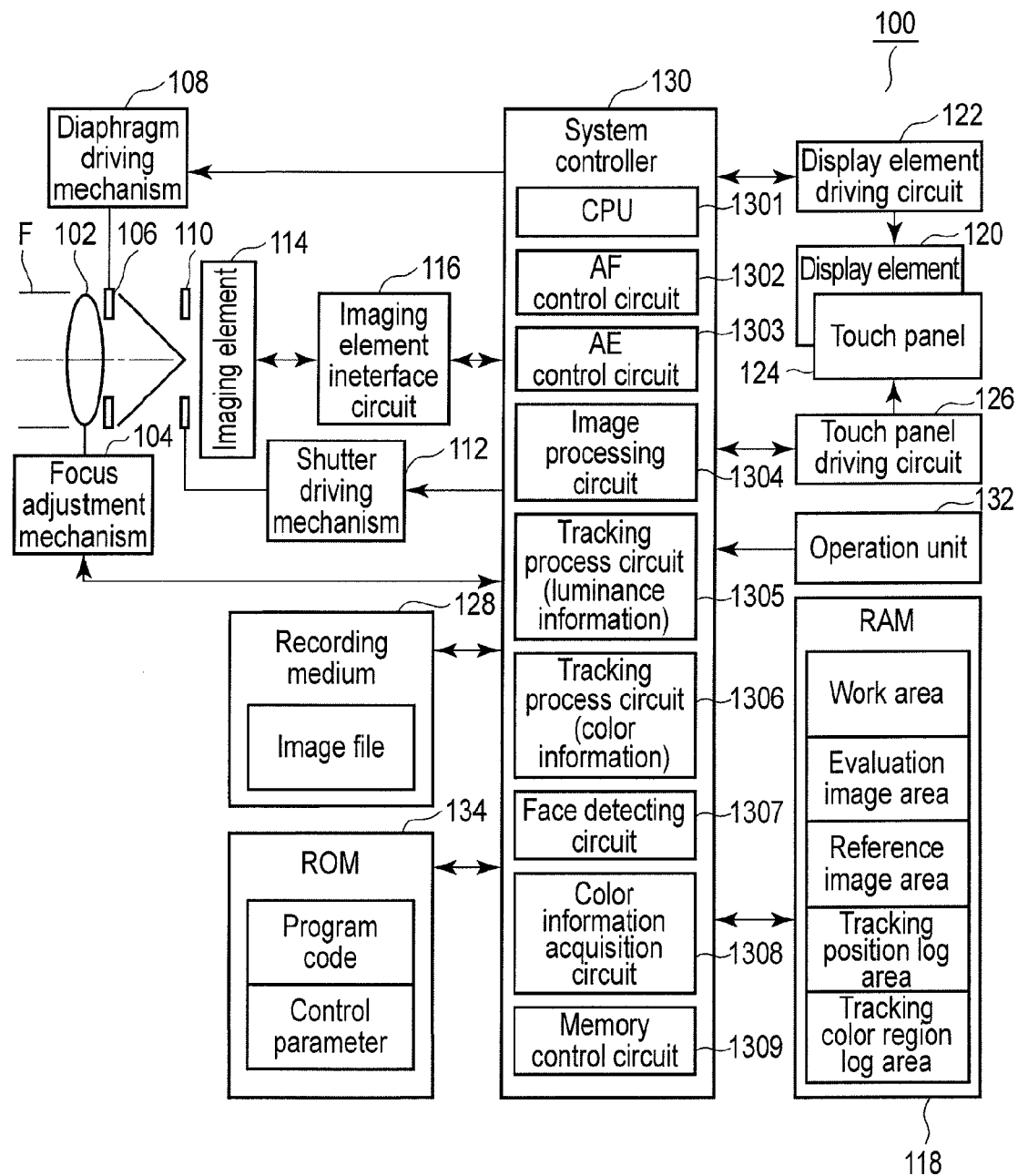
F I G. 1

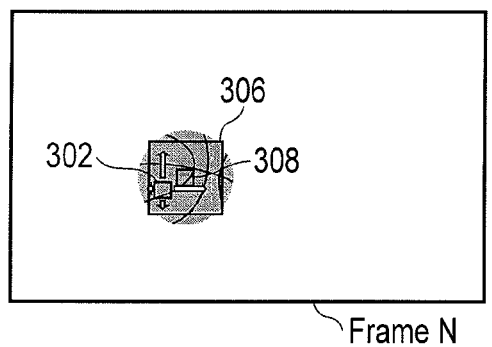
F I G. 3B
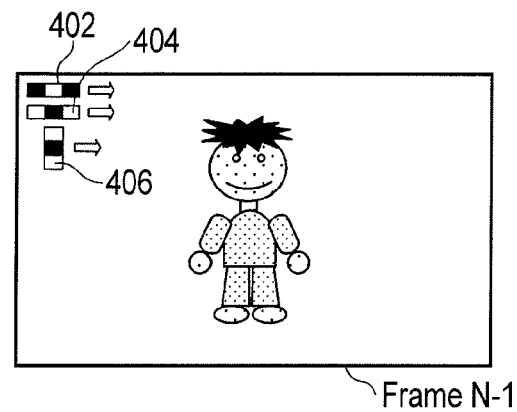
F I G. 4A
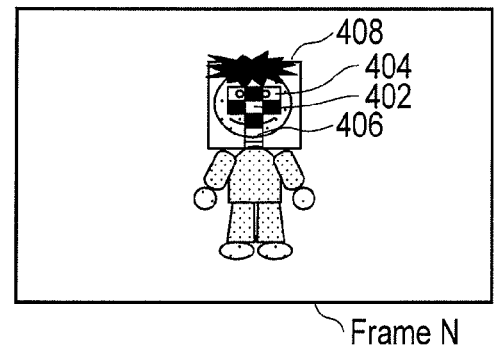
F I G. 4B

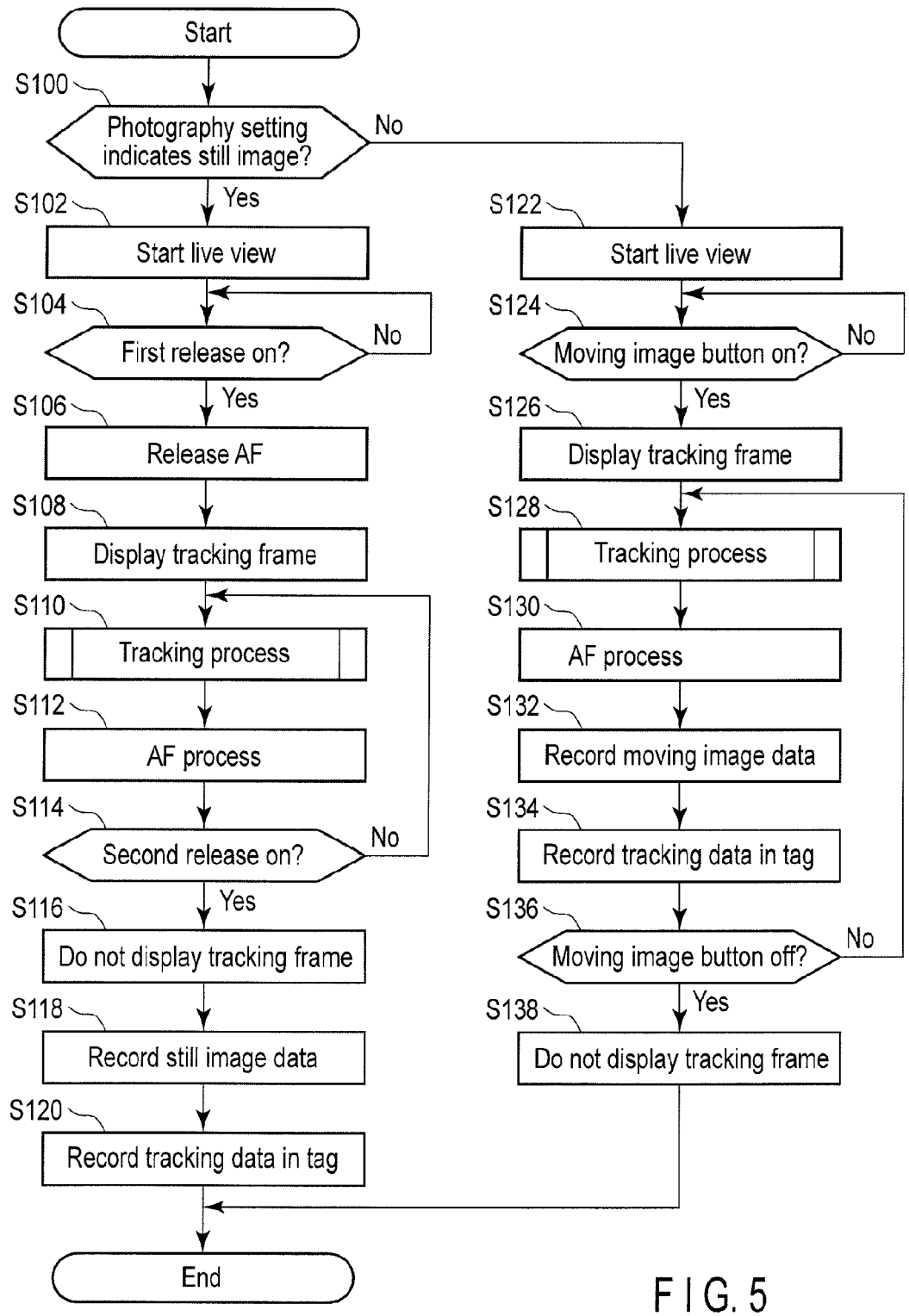
F I G. 5

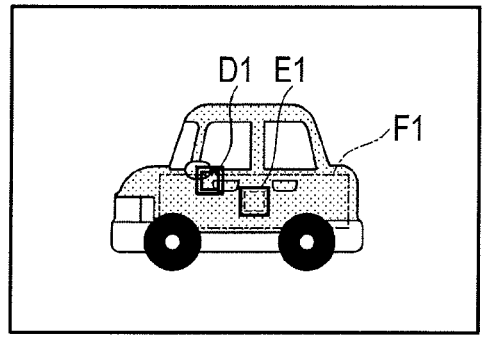
F I G. 9A
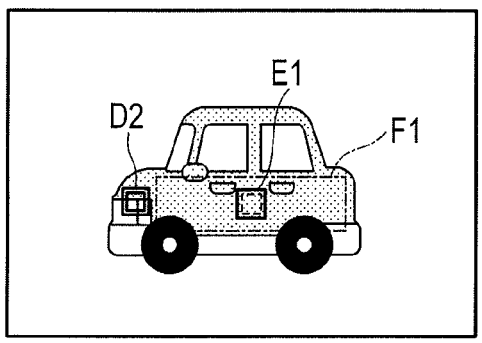
F I G. 9B
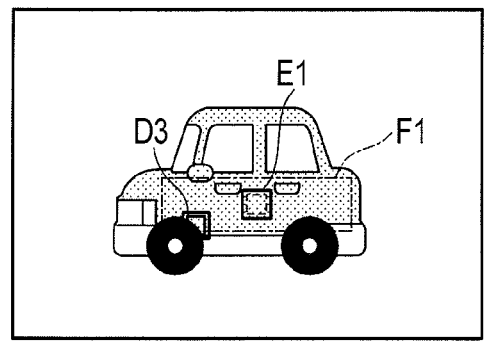
F I G. 9C

TRACKING APPARATUS FOR TRACKING TARGET SUBJECT IN INPUT IMAGE

CROSS-REFERENCE TO RELATED APPLICATIONS

This application is a Continuation Application of PCT Application No. PCT/JP2012/062940, filed May 21, 2012 and based upon and claiming the benefit of priority from prior Japanese Patent Application No. 2011-144769, filed Jun. 29, 2011, the entire contents of all of which are incorporated herein by reference.

BACKGROUND OF THE INVENTION

1. Field of the Invention

The present invention relates to a tracking apparatus and a tracking method to track a subject.

2. Description of the Related Art

It has heretofore been known to use a technique for performing automatic focus (AF) control and automatic exposure (AE) control to track a particular subject when photographing a moving body or when obtaining moving images. A tracking process is used to track the particular subject. There are various types of tracking processes, such as a tracking process that uses luminance information, a tracking process that uses color information, and a tracking process that uses face detection.

Here, when one kind of tracking process is only used, a failure in the tracking process may prevent correctly tracking processes that follow. In contrast, according to Japanese Patent No. 4506779, whether or not a face image is detected is determined by the result of a face detection in each frame. When the face image is not detected, for example, the frame in which the face image is not detected is matched with an adjacent frame to detect a part corresponding to the face image in the frame in which the face image is not detected.

BRIEF SUMMARY OF THE INVENTION

According to a first aspect of the invention, a tracking apparatus comprises: a tracking target subject specifying unit configured to specify a tracking target subject included in input image data; a first tracking position detection unit configured to detect first characteristic information from the image data and set, as a first candidate tracking position, the position of the tracking target subject in the image data in accordance with the first characteristic information; a second tracking position detection unit configured to detect characteristic information different from the first characteristic information as second characteristic information from the image data and detect, as a second candidate tracking position, the position of the tracking target subject in the image data in accordance with the second characteristic information; a reference information acquisition unit configured to acquire, as reference information, characteristic information which is present at the first candidate tracking position and which is of the same kind as the second characteristic information; and a control unit configured to decide a true tracking position in accordance with a determination on whether the second characteristic information and the reference information characteristically correspond to each other and a determination on whether the distance between the first candidate tracking position and the second candidate tracking position is small.

According to a second aspect of the invention, a tracking method comprises: causing a tracking target subject specifying unit to specify a tracking target subject included in input image data; causing a first tracking position detection unit to detect first characteristic information from the image data and detect, as a first candidate tracking position, the position of the tracking target subject in the image data in accordance with the first characteristic information; causing a second tracking position detection unit to detect characteristic information different from the first characteristic information as second characteristic information from the image data and detect, as a second candidate tracking position, the position of the tracking target subject in the image data in accordance with the second characteristic information; causing a reference information acquisition unit to acquire, as reference information, characteristic information which is present at the first candidate tracking position and which is of the same kind as the second characteristic information; and causing a control unit to decide a true tracking position in accordance with a determination on whether the second characteristic information and the reference information characteristically correspond to each other and a determination on whether the distance between the first candidate tracking position and the second candidate tracking position is small.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a configuration as one example of an imaging apparatus comprising a tracking apparatus according to an embodiment of the present invention;

FIG. 3B is a second view illustrating the tracking process that uses the color information;

FIG. 4A is a first view illustrating a face detection process;

FIG. 4B is a second view illustrating the face detection process;

FIG. 5 is a flowchart showing photography operation of the imaging apparatus;

FIG. 9A is a first view illustrating operation when the tracking process according to the embodiment of the present invention is performed;

FIG. 9B is a second view illustrating operation when the tracking process according to the embodiment of the present invention is performed;

FIG. 9C is a third view illustrating operation when the tracking process according to the embodiment of the present invention is performed;

DETAILED DESCRIPTION OF THE INVENTION

Figure 2A:
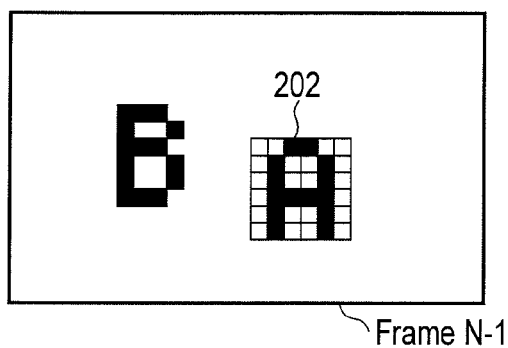
FIG. 2A is a first view illustrating a tracking process that uses luminance information.

Hereinafter, an embodiment of the present invention will be described with reference to the drawings.

FIG. 1 is a diagram showing a configuration as one example of an imaging apparatus comprising a tracking apparatus according to an embodiment of the present invention. An imaging apparatus 100 shown in FIG. 1 comprises a photographic optical system 102, a focus adjustment mechanism 104, a diaphragm 106, a diaphragm driving mechanism 108, a shutter 110, a shutter driving mechanism 112, an imaging element 114, an imaging element interface (IF) circuit 116, a RAM 118, a display element 120, a display element driving circuit 122, a touchpanel 124, a touchpanel driving circuit 126, a recording medium 128, a system controller 130, an operation unit 132, and a ROM 134.

The photographic optical system 102 is an optical system which focuses a light flux F from an unshown subject on a light receiving surface of the imaging element 114. The photographic optical system 102 has a plurality of lenses such as a focus lens. The focus adjustment mechanism 104 has a motor and its driving circuit. The focus adjustment mechanism 104 drives the focus lens in the photographic optical system 102 in its optical axis direction (chain line direction shown) under the control of a CPU 1301 in the system controller 130.

The diaphragm 106 is configured to open/close, and adjusts the light flux F entering the imaging element 114 via the photographic optical system 102. The diaphragm driving mechanism 108 has a driving mechanism for driving the diaphragm 106. The diaphragm driving mechanism 108 drives the diaphragm 106 under the control of the CPU 1301 in the system controller 130.

The shutter 110 is configured to allow the light receiving surface of the imaging element 114 to be shielded from light or exposed to light. The shutter 110 adjusts the exposure time of the imaging element 114. The shutter driving mechanism 112 has a driving mechanism for driving the shutter 110, and drives the shutter 110 under the control of the CPU 1301 in the system controller 130.

The imaging element 114 has the light receiving surface on which the light flux F from a subject focused via the photographic optical system 102 is formed into an image. The light receiving surface of the imaging element 114 comprises a plurality of two-dimensionally arranged pixels. A color filter is provided on the light entrance side of the light receiving surface. The imaging element 114 converts the figure (subject figure) corresponding to the light flux F formed into the image on the light receiving surface to an electric signal (hereinafter referred to as an image signal) corresponding to the amount of light amount. Here, regarding the imaging element 114, imaging elements having various configurations are known, such as a CCD imaging element and a CMOS imaging element. Regarding the color arrangement of the color filter, various arrangements such as a Bayer arrangement are known. The present embodiment is not limited to a particular configuration of the imaging element 114 and can use imaging elements having various configurations.

The imaging element interface circuit 116 drives the imaging element 114 under the control of the CPU 1301 in the system controller 130. The imaging element interface circuit 116 reads the image signal obtained by the imaging element 114 under the control of the CPU 1301 in the system controller 130, and subjects the read image signal to analog processing such as correlated double sampling (CDS) and automatic gain control (AGC). The imaging element interface circuit 116 converts the analog-processed image signal to a digital signal (hereinafter referred to as image data).

The RAM 118 is, for example, an SDRAM. The RAM 118 has, as storage areas, a work area, an evaluation image area, a reference image area, a tracking position log area, and a tracking color region log area. The work area is a storage area provided in the RAM 118 to temporarily store data generated in each section of the imaging device 100, for example, image data obtained by the imaging element interface circuit 116.

The evaluation image area is a storage area provided in the RAM 118 to temporarily store evaluation image data. The evaluation image data is image data for a frame containing a subject which is a tracking target in a later-described tracking process. The tracking process is performed to track the tracking target.

The reference image area is a storage area provided in the RAM 118 to temporarily store reference image data. The reference image data is image data for a search target frame of the tracking target in the later-described tracking process. In the tracking process, the reference image data is searched.

The tracking position log area is a storage area provided in the RAM 118 to temporarily store a tracking position log. The tracking position log is a log to record a tracking position obtained as a result of the tracking process. In the present embodiment, the tracking target is tracked by use of a plurality of tracking processes together. Therefore, for example, the past ten frames of tracking positions (candidate tracking positions) obtained by the respective candidate are individually recorded in the tracking position log. A final tracking position adopted by a later-described priority tracking position determination process is also recorded in the tracking position log.

The tracking color region log area is a storage area provided in the RAM 118 to temporarily store a tracking color region log. The tracking color region log is a log to record a tracking color region obtained by the tracking process. In the present embodiment, for example, the past ten frames of tracking color regions are recorded. Details of the tracking color region will be described later.

The display element 120 is, for example, a liquid crystal display (LCD), and displays various images such as images for live view, and images recorded in the recording medium 128. The display element driving circuit 122 drives the display element 120 in accordance with the image data input from the CPU 1301 of the system controller 130, and displays images on the display element 120.

The touchpanel 124 is integrally formed on a display screen of the display element 120, and detects, for example, a contact position of the finger of a user on the display screen.

The touchpanel driving circuit 126 drives the touchpanel 124, and outputs, to the CPU 1301 of the system controller 130, a contact detection signal from the touchpanel 124. The CPU 1301 detects the user's contact operation on the display screen from the contact detection signal, and performs processing corresponding to the contact operation.

The recording medium 128 is, for example, a memory card. An image file obtained by photography operation is recorded in the recording medium 128. The image file is a file which comprises image data and a predetermined header attached thereto. For example, data indicating a photography condition and data indicating a tracking position are recorded in the header as tag data.

The system controller 130 has, as control circuits for controlling the operation of the imaging device 100, the CPU 1301, an AF control circuit 1302, an AE control circuit 1303, an image processing circuit 1304, a tracking process circuits 1305 and 1306, a face detecting circuit 1307, a color information acquiring circuit 1308, and a memory control circuit 1309.

The CPU 1301 controls the operations of blocks outside the system controller 130 such as the focus adjustment mechanism 104, the diaphragm driving mechanism 108, the shutter driving mechanism 112, the display element driving circuit 122, and the touchpanel driving circuit 126, and the operations of the control circuits inside the system controller 130. The CPU 1301 also functions as a control unit, and determines a final tracking position in a later-described priority tracking determination process.

The AF control circuit 1302 controls a contrast AF process. More specifically, the AF control circuit 1302 extracts a high-frequency component of the image data obtained by the imaging element interface circuit 116, and accumulates the extracted high-frequency component to acquire an in-focus evaluation value for AF. The CPU 1301 evaluates the contrast of the image data in accordance with the in-focus evaluation value, and at the same time, controls the focus adjustment mechanism 104, thereby bringing the focus lens into focus.

The AE control circuit 1303 controls AE operation. More specifically, the AE control circuit 1303 calculates subject luminance by using the image data obtained by the imaging element interface circuit 116. In accordance with the subject luminance, the CPU 1301 calculates, for example, an opening amount (aperture value) of the diaphragm 106 during exposure, the release time (shutter speed) of the shutter 110, the imaging element sensitivity, and the ISO rating.

The image processing circuit 1304 performs various kinds of image processing for the image data. The image processing includes, for example, color correction processing, gamma (γ) correction processing, and compression processing. The image processing circuit 1304 also expands compressed image data.

The tracking process circuit 1305 as a first tracking position detection unit performs a tracking process that uses luminance information for the image data as first characteristic information. The tracking process that uses the luminance information is briefly described. For example, a tracking target is set in frame N−1 shown in FIG. 2A. In this case, in the tracking process that uses the luminance information, image data in the frame N−1 is stored in the evaluation image area of the RAM 118 as evaluation image data. Image data in a predetermined range 202 of the evaluation image data including the tracking target is set as standard image data. In the subsequent tracking process, a part corresponding to the standard image data 202 of the reference image data is searched for.

Figure 2B:
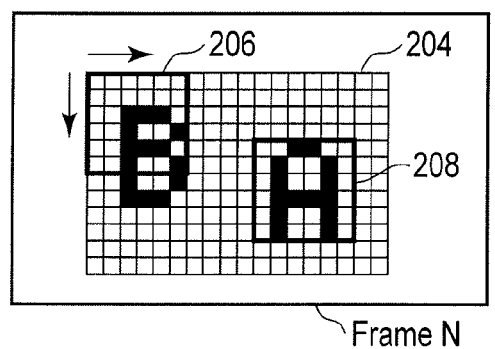
FIG. 2B is a second view illustrating the tracking process that uses the luminance information.

If the tracking process of frame N is shown by way of example, the image data for frame N is stored in the reference image area of the RAM 118 as reference image data. The correlation amount between image data in a predetermined search range 204 of the reference image data and the standard image data 202 is found to search for a part of the reference image data corresponding to the standard image data 202. The correlation amount is determined, for example, from the sum of absolute differences between the standard image data and the reference image data. The sum of absolute differences is the accumulation of absolute values of luminance differences found for the respective pixels. For example, if the sum of absolute differences between a region 206 in the reference image data and the standard image data 202, shown in FIG. 2B, is found, the region 206 of the reference image data and the standard image data 202 are obviously different image data, so that the sum of absolute differences is great. In contrast, if the sum of absolute differences between a region 208 of the reference image data and the standard image data 202 is found, the sum of absolute differences is small. Thus, the sum of absolute differences is smaller when the correlation amount with the standard image data 202 is greater. In the tracking process that uses the luminance information, a region having the maximum correlation, that is, the minimum sum of absolute differences is searched for from the reference image data. In the example shown in FIG. 2B, the region 208 is searched for. In the tracking position log area, a position having the highest correspondence in the region 208 is recorded as a tracking position. When there are a plurality of such positions, for example, a position close to the center of the region 208 is set as a tracking position. In the next tracking process, this tracking position is preferably used as the start position of the tracking process. This can reduce the time required for the tracking process.

Figure 3A:
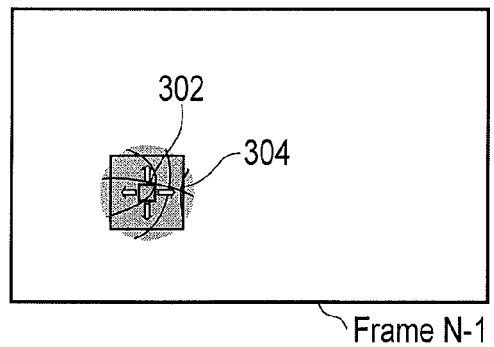
FIG. 3A is a first view illustrating a tracking process that uses color information.

The tracking process circuit 1306 as a second tracking position detection unit performs a tracking process that uses color information for the image data as second characteristic information. The tracking process that uses the color information is briefly described. In the tracking process that uses the color information, a tracking color region which is a region that can be determined to have the same color as the color set in the evaluation image data is searched for. When a given position 302 of the subject is specified in the frame N−1 as shown in FIG. 3A, the color information for the position 302 in the evaluation image data is acquired. The position 302 is used as the start position of the tracking process to search for a region having the same color information as the position 302. More specifically, the color information is sequentially acquired from the position 302 as the start position to the periphery. The acquired color information is included in the region when this color information can be determined to be the same as the color information for the position 302. The acquired color information is not included in the region when this color information cannot be determined to be the same as the color information for the position 302. As a result of searching for the tracking color region in this way, a rectangular region 304 inscribed in the subject is the tracking color region, for example, when the subject has a single color as shown in FIG. 3A. The tracking position to be recorded in the tracking position log area is, for example, the gravity center position (which is the same as the position 302 in the example shown in FIG. 3A) of the tracking color region 304. In the next tracking process, this tracking position is used as the start position of the tracking process.

The tracking process of the frame N is shown by way of example. The tracking position 302 of the frame N−1 is used as the start position of the tracking process, in a predetermined search range of the image data of the frame N stored as the reference image data shown in FIG. 3B. Regions which can be determined to have the same color as the color of the tracking color region 304 are then searched for as tracking color regions sequentially from the periphery of the tracking position 302. In the example shown in FIG. 3B, a region 306 is the tracking color region. Moreover, in the example shown in FIG. 3B, a gravity center position 308 is set as a tracking position, and this tracking position 308 is recorded in the tracking position log area. In the tracking color region log area, information (e.g. the positions of four corners) indicating the range of the tracking color region 306 is recorded.

The face detection circuit 1307 detects the face of the subject (person) in the image data. A face detection process is briefly described. In the face detection process, the correlation amount between image data obtained in each frame and face parts 402, 404, and 406 shown in FIG. 4A is found. The face part 402 is image data corresponding to a shade pattern around the nose of the person. The face part 404 is image data corresponding to a shade pattern around the eyes of the person. The face part 406 is image data corresponding to a shade pattern around the mouth of the person. The correlation amount between the image data and the face parts 402, 404, and 406 is maximized at a predetermined arrangement that indicates the face of the person shown in FIG. 4B. Here, the face is present in a region 408 including the face parts 402, 404, and 406. The sizes of the face parts 402, 404, and 406 may be changed in accordance with the size of a preset search face. The face region is rectangular in FIG. 4B, but may otherwise be circular.

The color information acquisition circuit 1308 as an example of a reference information acquisition unit acquires color information for the tracking position obtained in the tracking process circuit 1305. The color information is used in the priority tracking position determination process.

The memory control circuit 1309 is an interface which is controlled, for example, by the CPU 1301 to access the RAM 118, the recording medium 128, and the ROM 134.

The operation unit 132 includes various operation members to be operated by the user. For example, the operation unit 132 includes a release button, a moving image button, a mode dial, a selection key, and a power supply button.

The release button has a first release switch and a second release switch. The first release switch is turned on when the release button is pressed halfway by the user. When the first release switch is turned on, photographic preparation operation such as an AF process is performed. The second release switch is turned on when the release button is fully pressed by the user. When the second release switch is turned on, exposure operation for still image photography is performed.

The moving image button is an operation member for indicating the start or end of moving image photography. If the moving image button is pressed by the user, a moving image photography process is started. If the moving image button is pressed during the execution of the moving image photography process, the moving image photography process is ended.

The mode dial is an operation member for selecting a photography setting of the imaging apparatus. In the present embodiment, for example, a still image photography mode and a moving image photography mode can be selected as the photography setting of the imaging apparatus. The still image photography mode is a photography setting for still image photography. The moving image photography mode is a photography setting for moving image photography.

The selection key is an operation member for selecting or deciding an item, for example, on a menu screen. If the selection key is operated by the user, an item is selected or decided on the menu screen.

The power supply button is an operation member for turning on or off the power supply of the imaging apparatus. If the power supply button is operated by the user, the imaging apparatus 100 is activated and becomes operable. If the power supply button is operated while the imaging device is activated, the imaging apparatus 100 is set to a power saving standby state.

A program code for the CPU 1301 to perform various kinds of processing is stored in the ROM 134. Various control parameters are also stored in the ROM 134, such as control parameters necessary for the operations of the photographic optical system 102, the diaphragm 106, and the imaging element 114, and control parameters necessary for image processing in the image processing circuit 1304. Moreover, for example, data for face parts used in the face detection in the face detecting circuit 1307, and data for displaying a tracking frame are also stored in the ROM 134.

Now, the operation of the imaging apparatus according to the present embodiment is described. FIG. 5 is a flowchart showing photography operation of the imaging apparatus 100. The CPU 1301 reads a necessary program code from the ROM 134 to control the operation shown in FIG. 5.

In step S100, the CPU 1301 determines whether the current photography setting of the imaging apparatus 100 is the still image photography mode. As described above, the photography setting is set by the mode dial.

In step S100, when the photography setting is determined to be the still image photography mode, the CPU 1301 starts a live view operation in step S102. In the live view operation, the CPU 1301 controls the shutter driving mechanism 112 to release the shutter 110. The CPU 1301 then controls the imaging element interface circuit 116 to start the imaging by the imaging element 114. The CPU 1301 then inputs, to the image processing circuit 1304, the image data which has been stored in the work area of the RAM 118 as a result of the imaging by the imaging element 114, and the image data is subjected to image processing for live view display. The CPU 1301 then inputs, to the display element driving circuit 122, the image data which has been subjected to the image processing for the live view display, and an image is displayed on the display element 120. Moving images of the subject are displayed by repeating the above-described display operation. The user can observe the subject by the moving image display.

In step S104, the CPU 1301 determines whether the first release switch has been turned on. The CPU 1301 continues the live view operation until it is determined in step S104 that the first release switch has been turned on.

When determining in step S104 that the first release switch has been turned on, the CPU 1301 performs a release AF process in step S106. In the release AF, the focus lens is driven to an in-focus position by scan drive. In the scan drive, the CPU 1301 controls the focus adjustment mechanism 104 to drive the focus lens in one direction within a predetermined scan range, and at the same time, evaluates in-focus evaluation values sequentially calculated by the AF control circuit 1302. The CPU 1301 stops the driving of the focus lens at a lens position where contrast is maximized as a result of the evaluation of the in-focus evaluation values. Such scan drive is performed when there is a great difference between the position of the focus lens before AF and the in-focus position.

In step S108, the CPU 1301 controls the display element driving circuit 122 to display a tracking frame on the display element 120. The tracking frame is displayed at the position of the tracking target on the screen of the display element 120. For example, a subject brought into focus by the release AF may be set as a tracking target, and the tracking frame may be displayed on this subject. When the face is detected by the face detecting circuit 1307, the tracking frame D1 may be displayed on the face. When the subject displayed on the screen of the display element 120 is specified by the touchpanel 124, the tracking frame may be displayed on this subject. In this way, in the present embodiment, the CPU 1301, the AF control circuit 1302, the face detecting circuit 1307, and the touchpanel 124, for example, function as an example of a tracking target subject specifying unit.

In step S110, the CPU 1301 performs a tracking process. This tracking process will be described later.

In step S112, the CPU 1301 performs an AF process to bring the subject at the tracking position into focus, and performs an AE process so that the exposure for the subject at the tracking position will be correct.

In the AF process after the tracking process, the focus lens is driven to the in-focus position by the scan drive or wobbling drive. In the wobbling drive, the CPU 1301 determines whether the in-focus evaluation value calculated by the AF control circuit 1302 when the focus lens is driven has increased as compared with the in-focus evaluation value at the previous lens position. When the in-focus evaluation value has increased, the CPU 1301 slightly drives the focus lens in the same direction as the previous direction. When the in-focus evaluation value has decreased, the CPU 1301 slightly drives the focus lens in a direction opposite to the previous direction. Such operation is rapidly repeated to gradually drive the focus lens to the in-focus position.

In the AE process, the CPU 1301 calculates the opening amount (aperture value) of the diaphragm 106 and the release time (shutter speed) of the shutter 110 during this exposure so that the luminance of the subject at the tracking position calculated by the AE control circuit 1303 will reach a predetermined correct value (correct exposure).

In step S114, the CPU 1301 determines whether the second release switch has been turned on. When determining in step S114 that the second release switch has not been turned on, the CPU 1301 performs processes after the tracking process in step S110. Thus, in the still image photography mode, the tracking process is continued until the second release switch is turned on.

When determining in step S114 that the second release switch has been turned on, the CPU 1301 controls the display element driving circuit 122 so that the tracking frame is not displayed, in step S116.

In step S118, the CPU 1301 performs a process to record still image data in the recording medium 128. At the same time, the CPU 1301 controls the shutter driving mechanism 112 to close the shutter 110. The CPU 1301 then controls the diaphragm driving mechanism 108 to narrow the diaphragm 106 to the previously calculated aperture value. The CPU 1301 then controls the shutter driving mechanism 112 to release the shutter 110 for the previously calculated release time, and at the same time, performs the photography (exposure) by the imaging element 114. The CPU 1301 then processes, in the image processing circuit 1304, the still image data obtained via the imaging element 114. The CPU 1301 then provides a header to the still image data processed in the image processing circuit 1304 to generate a still image file, and records the generated still image file in the recording medium 128. In step S120, the CPU 1301 additionally writes data that indicates the tracking position obtained as a result of the tracking process in step S110 in the still image file previously recorded in the recording medium 128. The CPU 1301 then ends the operation shown in FIG. 5.

When the photography setting is determined to be the moving image photography mode in step S100, the CPU 1301 starts the live view operation in step S122.

In step S124, the CPU 1301 determines whether the moving image button has been turned on. The CPU 1301 continues the live view operation until determining in step S124 that the moving image button has been turned on.

When determining in step S124 that the moving image button has been turned on, the CPU 1301 controls the display element driving circuit 122 so that the tracking frame is displayed on the display element 120, in step S126.

In step S128, the CPU 1301 performs a tracking process. Derails of the tracking process will be described later.

In step S130, the CPU 1301 performs an AF process to bring the subject at the tracking position into focus, and performs an AE process so that the exposure for the subject at the tracking position will be correct. In the AF process in step S130, the focus lens is driven to the in-focus position by the wobbling drive.

In step S132, the CPU 1301 performs a process to record moving image data in the recording medium 128. At the same time, the CPU 1301 controls the diaphragm driving mechanism 108 to narrow the diaphragm 106 to the aperture value calculated in the AE process. The CPU 1301 then causes the imaging element 114 to perform imaging (exposure) for a time corresponding to the shutter speed calculated in the AE process. After the end of the exposure, the CPU 1301 generates a moving image file and records the moving image file in the recording medium 128. The CPU 1301 processes, in the image processing circuit 1304, the moving image data obtained via the imaging element 114, and records, in the moving image file, the moving image data processed in the image processing circuit 1304.

In step S134, the CPU 1301 records data that indicates the tracking position obtained as a result of the tracking process in step S128 simultaneously with the moving image file previously recorded in the recording medium 128.

In step S136, the CPU 1301 determines whether the moving image button has been turned off. When determining in step S136 that the moving image button has not been turned off, the CPU 1301 performs processes after the tracking process in step S128. Thus, in the moving image photography mode, the tracking process and the recording of the moving image data are continued until the moving image button is turned off.

When determining in step S136 that the moving image button has been turned off, the CPU 1301, in step S138, controls the display element driving circuit 122 so that the tracking frame is not displayed. The CPU 1301 then ends the operation shown in FIG. 5.

Figure 6:
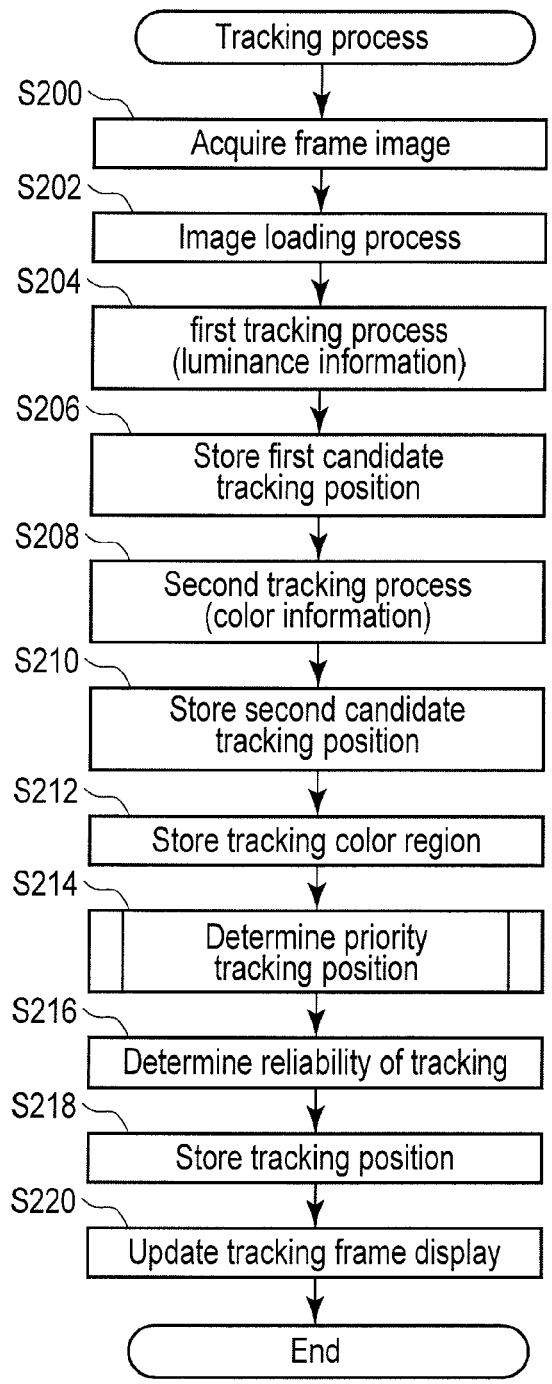
FIG. 6 is a flowchart showing the tracking process as a tracking method according to the embodiment of the present invention.

Now, the tracking process as a tracking method according to the present embodiment is described with reference to FIG. 6. As described above, in the present embodiment, the tracking target is tracked by use of a plurality of tracking processes together.

In step S200, the CPU 1301 controls the imaging element interface circuit 116 to perform the imaging by the imaging element 114. In step S202, the CPU 1301 stores, into the RAM 118, image data obtained in the imaging element interface circuit 116 as a result of the imaging by the imaging element 114. Here, image data obtained in the initial tracking process is evaluation image data. Accordingly, the CPU 1301 stores the image data obtained in the initial tracking process into the evaluation image area of the RAM 118. Image data obtained in and after the second tracking process are reference image data. Accordingly, the CPU 1301 stores the image data obtained in and after the second tracking process into the reference image area of the RAM 118.

In step S204, the CPU 1301 uses the tracking process circuit 1305 to perform the tracking process that uses the luminance information as a first tracking process. The tracking process that uses the luminance information has been described above, and is therefore not described again. In the initial tracking process, the evaluation image data is only acquired, so that processing in and after step S204 is omitted. The explanation that follows is based on the assumption that both the evaluation image data and the reference image data have been acquired. In step S206, the CPU 1301 stores, in the tracking log area of the RAM 118, a tracking position obtained as a result of the tracking process that uses the luminance information, as a first candidate tracking position.

In step S208, the CPU 1301 uses the tracking process circuit 1306 to perform the tracking process that uses the color information as the second tracking process. The tracking process that uses the color information has been described above, and is therefore not described again. In step S210, the CPU 1301 stores, in the tracking log area of the RAM 118, a tracking position obtained as a result of the tracking process that uses the color information, as a second candidate tracking position. In step S212, the CPU 1301 stores, in the tracking color region log area of the RAM 118, a tracking color region obtained as a result of the tracking process that uses the color information.

In step S214, the CPU 1301 performs the priority tracking position determination process. The priority tracking position determination process is a process for determining whether to adopt the result of the tracking process that uses the luminance information or the result of the tracking process that uses the color information. The priority tracking position determination process will be described later in detail.

In step S216, the CPU 1301 determines the reliability of the tracking position adopted as a result of the priority tracking position determination process. When the result of the tracking process that uses the luminance information is adopted, the reliability is determined, for example, by the contrast of the reference image data. More specifically, when the sum of the differences between adjacent pixels in the region of the tracking target in the reference image data is smaller than or equal to a predetermined value, the tracking position is determined to be reliable. When the result of the tracking process that uses the color information is adopted, the reliability is determined, for example, by the saturation of the reference image data. More specifically, when the saturation of the tracking position of the reference image data is greater than or equal to a predetermined value, the tracking position is determined to be reliable. The thresholds for determining the above-mentioned reliability can be correctly set.

In step S218, the CPU 1301 records the final tracking position of the reference image data in the tracking position log area of the RAM 118. In the next tracking process, this final tracking position is used as a start position of the tracking process in both the tracking process that uses the luminance information and the tracking process that uses the color information. However, when the tracking position is determined to be unreliable in step S216, the tracking position may not be recorded.

In step S220, the CPU 1301 controls the display element driving circuit 122 to update the display position of the tracking frame to a position corresponding to the tracking position stored in step S218. The CPU 1301 then ends the tracking process shown in FIG. 6.

Figure 7:
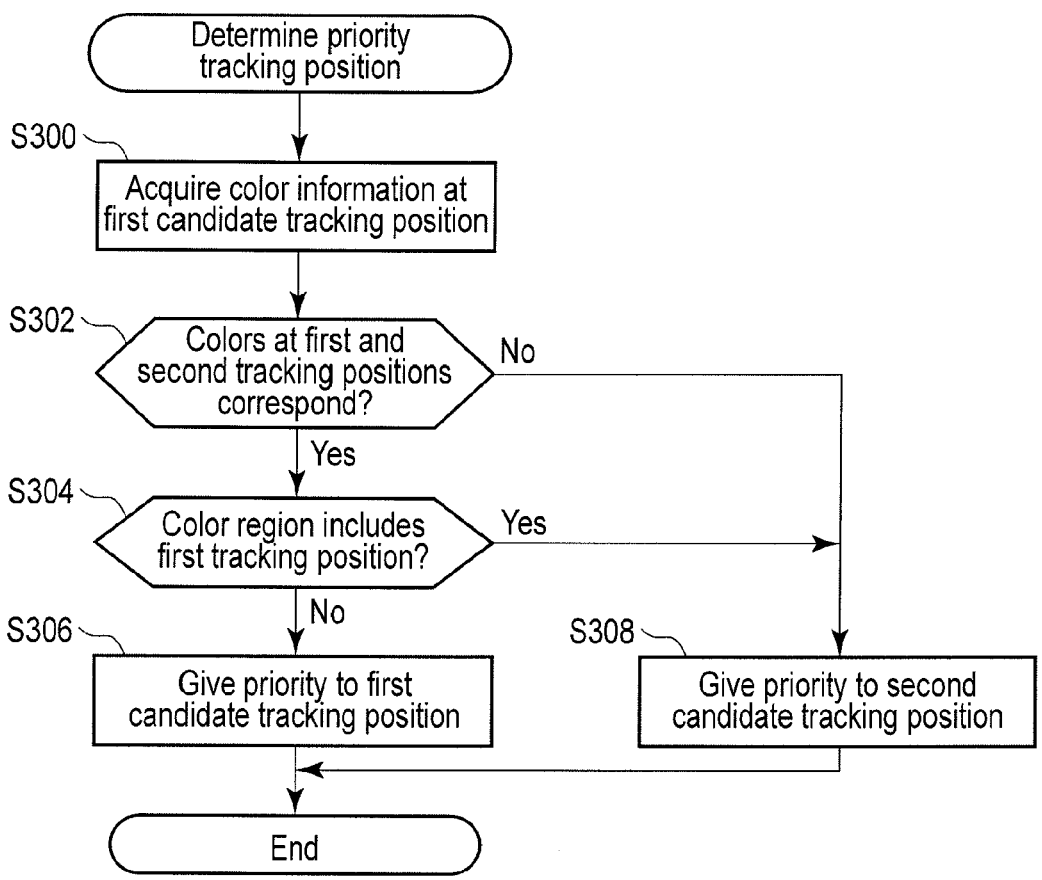
FIG. 7 is a flowchart showing a priority tracking position determination process.

Now, the priority tracking position determination process is described with reference to FIG. 7. In the priority tracking position determination process, the final tracking position is determined by the positional relation between the first candidate tracking position and the second candidate tracking position.

In step S300, the CPU 1301 uses the color information acquisition circuit 1308 to acquire color information at the first candidate tracking position for the reference image data as reference information. Actually, color information for a small region including the first candidate tracking position is acquired.

In step S302, the CPU 1301 determines whether the color information at the first candidate tracking position corresponds to the color information at the second candidate tracking position (color information for the tracking color region obtained by the tracking process that uses the color information). Here, the correspondence means that the color information at the first candidate tracking position is within a given range preset on the basis of the color information at the second candidate tracking position. When the color information at the first candidate tracking position corresponds to the color information at the second candidate tracking position in step S302, the CPU 1301 determines in step S304 whether the tracking color region includes the first candidate tracking position.

When determining in step S304 that the tracking color region does not include the first candidate tracking position, the CPU 1301 adopts the first candidate tracking position as the final tracking position in step S306. The CPU 1301 then ends the tracking process shown in FIG. 7.

When the color information at the first candidate tracking position does not correspond to the color information at the second candidate tracking position in step S302, or when it is determined in step S304 that the tracking color region includes the first candidate tracking position, the CPU 1301 adopts the second candidate tracking position as the final tracking position in step S308. The CPU 1301 then ends the tracking process shown in FIG. 7.

Advantageous effects of the present embodiment are described below.

Figure 8A:
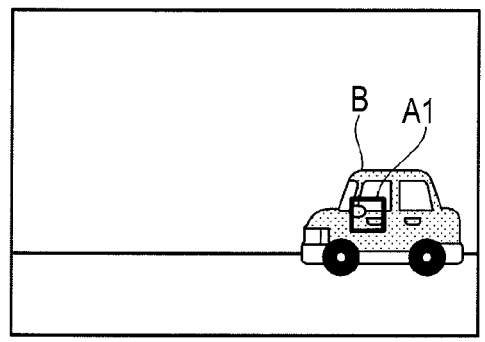
FIG. 8A is a first view illustrating operation when one of the luminance information and the color information is used to perform a tracking process.

To describe the advantageous effects of the present embodiment, the case in which one of the tracking process that uses the luminance information and the tracking process that uses the color information is only used is first described. Suppose that a position A1 of a subject B shown in FIG. 8A has been specified as a tracking target in a given frame before a tracking process. In this case, image data shown in FIG. 8A is the evaluation image data. Image data therein at the position A1 is the standard image data. The tracking frame is then displayed at the position A1.

Figure 8B:
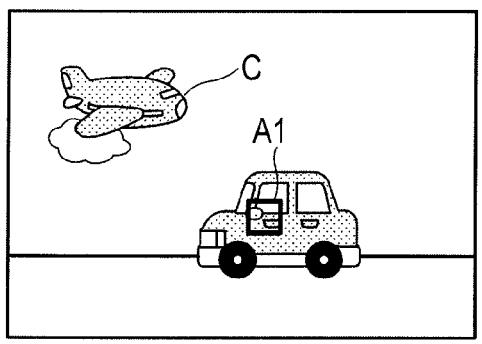
FIG. 8B is a second view illustrating operation when one of the luminance information and the color information is used to perform a tracking process.

Suppose that a subject C has then approached the subject B in another frame. The subject C has the same color as the tracking target subject B. Suppose that image data for a frame including a plurality of subjects having the same color is used as the reference image data to perform the tracking process that uses the luminance information. In this case, the reference image data is searched for a region having the luminance information corresponding to the position A1 shown in FIG. 8A. Therefore, the tracking position obtained by the tracking process is the position A1 on the subject B shown in FIG. 8B, and the position of the tracking frame is updated accordingly.

In the meantime, suppose that image data for a frame including a plurality of subjects having the same color is used as the reference image data to perform the tracking process that uses the color information. In this case, the reference image data is searched for a region having the same color information as the position A1 shown in FIG. 8A. Therefore, as shown in FIG. 8C, the tracking position obtained by the tracking process may be changed to a position A2 on the subject C rather than on the subject B.

Figure 8C:
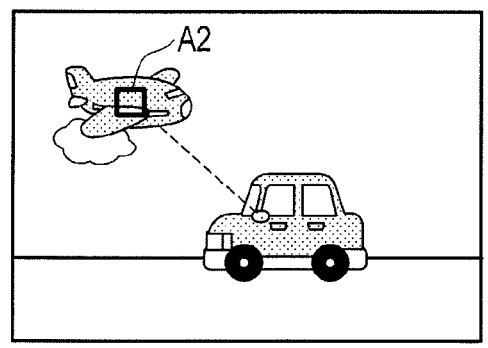
FIG. 8C is a third view illustrating operation when one of the luminance information and the color information is used to perform a tracking process.

As shown in FIG. 8C, if the tracking process that uses the color information is performed for a scene including a plurality of subjects having the same color, the tracking position may be shifted due to the subjects having the same color. In the tracking process that uses the luminance information, there is no possibility that the tracking position may be shifted to the subject having the same color. However, for example, the tracking position may be shifted to the subject having the same pattern as the position A1 shown in FIG. 8A. In the tracking process that uses the luminance information, a subject having no contrast cannot be tracked. On the other hand, in the tracking process that uses the color information, a subject without even contrast can be tracked, but a subject having no color (saturation) cannot be tracked.

Thus, when one of the tracking process that uses the luminance information and the tracking process that uses the color information is only used, tracking may be impossible depending on the scene, or a tracking result may be incorrect. In the present embodiment, a plurality of tracking processes are correctly used together so that scenes which are unsuited to some of the tracking processes can be tracked by the rest of the tracking processes.

In the priority tracking position determination process described above, four determination results are conceivable: (1) the first candidate tracking position and the second candidate tracking position have the same color, and the tracking color region includes the first candidate tracking position; (2) the first candidate tracking position and the second candidate tracking position have different colors, and the tracking color region does not include the first candidate tracking position; (3) the first candidate tracking position and the second candidate tracking position have different colors, and the tracking color region includes the first candidate tracking position; and (4) the first candidate tracking position and the second candidate tracking position have the same color, and the tracking color region does not include the first candidate tracking position.

For example, FIG. 9A is a diagram showing a scene corresponding to the example of (1). In this example, the first candidate tracking position is a position D1. The second candidate tracking position is a position E1. The tracking color region is a region F1. In the example of (1), as shown in FIG. 9A, color information at the first candidate tracking position D1 and color information at the second candidate tracking position E1 correspond to each other, and the first candidate tracking position D1 is included in the tracking color region F1. Therefore, the second candidate tracking position will be the final tracking position as a result of the priority tracking determination. As the first candidate tracking position and the second candidate tracking position have the same color, the tracking position may be shifted due to the subjects having the same color in the tracking process that uses the color information. However, the first candidate tracking position and the second candidate tracking position are close to each other, and it can therefore be considered that both the first candidate tracking position and the second candidate tracking position are located on the same subject. In this case, the result of the tracking process that uses the color information is given priority. In the tracking process that uses the color information, even a tracking target that rapidly changes in shape (e.g. that makes rapid movement changes) can be tracked. In the case of FIG. 9A, the result of the tracking process that uses the luminance information can be given priority if no saturation is found as a result of a reliability determination.

FIG. 9B is a diagram showing a scene corresponding to the example of (2). In this example, the first candidate tracking position is a position D2. The second candidate tracking position is a position E1. The tracking color region is a region F1. In the example of (2), color information at the first candidate tracking position D2 and color information at the second candidate tracking position E1 do not correspond to each other, and the first candidate tracking position D2 is not included in the tracking color region F1. Therefore, the second candidate tracking position will be the final tracking position as a result of the priority tracking determination. As the first candidate tracking position and the second candidate tracking position do not have the same color, it can be considered that the tracking position is not shifted by the tracking process that uses the color information. Thus, in this case, the result of the tracking process that uses the color information is given priority. In the case of FIG. 9B, it is preferable that the result of the tracking process that uses the luminance information is not given priority even if no saturation is found as a result of a reliability determination. This is attributed to the fact that the first candidate tracking position and the second candidate tracking position are not close to each other and that both the first candidate tracking position and the second candidate tracking position cannot be considered to be located on the same subject.

FIG. 9C is a diagram showing a scene corresponding to the example of (3). In this example, the first candidate tracking position is a position D3. The second candidate tracking position is a position E1. The tracking color region is a region F1. In the example of (3), color information at the first candidate tracking position D3 and color information at the second candidate tracking position E1 do not correspond to each other, and the first candidate tracking position D3 is included in the tracking color region F1. Therefore, the second candidate tracking position will be the final tracking position as a result of the priority tracking determination. As the first candidate tracking position and the second candidate tracking position do not have the same color, it can be considered that the tracking position is not shifted by the tracking process that uses the color information. Thus, in this case, the result of the tracking process that uses the color information is given priority. In the case of FIG. 9C, it is preferable that the result of the tracking process that uses the luminance information is not given priority even if no saturation is found as a result of a reliability determination. This is attributed to the fact that the color information at the first candidate tracking position and the color information at the second candidate tracking position do not correspond to each other and that both the first candidate tracking position and the second candidate tracking position cannot be considered to be located on the same subject.

Figure 9D:
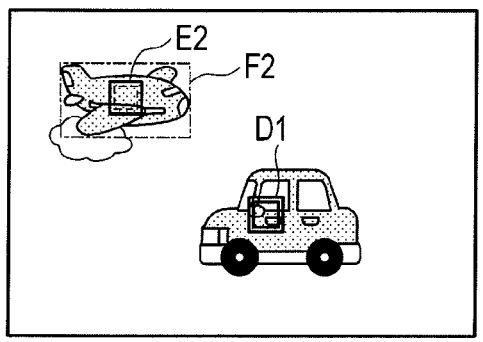
FIG. 9D is a fourth view illustrating operation when the tracking process according to the embodiment of the present invention is performed.

FIG. 9D is a diagram showing a scene corresponding to the example of (4). In this example, the first candidate tracking position is a position D1. The second candidate tracking position is a position E2. The tracking color region is a region F2. In the example of (4), color information at the first candidate tracking position D1 and color information at the second candidate tracking position E1 correspond to each other, and the first candidate tracking position D1 is not included in the tracking color region F2. Therefore, the first candidate tracking position will be the final tracking position as a result of the priority tracking determination. When the first candidate tracking position and the second candidate tracking position have the same color, the tracking position may be shifted due to the subjects having the same color in the tracking process that uses the color information. As the distance between the first candidate tracking position and the second candidate tracking position is great (the first candidate tracking position is not included in the tracking color region obtained so that this region is inscribed in the tracking target subject), it can be considered that the tracking position is shifted in the tracking process that uses the color information. Thus, in this case, the result of the tracking process that uses the luminance information is given priority. In the case of FIG. 9D, it is preferable that the result of the tracking process that uses the color information is not given priority even if no contrast is found as a result of a reliability determination.

As described above, according to the present embodiment, the tracking process that uses the luminance information or the tracking process that uses the color information is correctly used depending on a scene. In this embodiment, the result of the tracking that uses the color information is given priority for a scene which is unsuited to the tracking process that uses the luminance information, whereas the result of the tracking that uses the luminance information is given priority for a scene which is unsuited to the tracking process that uses the color information. This can reduce the unsuited scenes and this improves tracking performance.

Furthermore, according to the present embodiment, it is determined whether the first candidate tracking position and the second candidate tracking position have the same color, and it is also determined whether the first candidate tracking position is included in the tracking color region. Thus, it is determined whether the tracking process that uses the color information is influenced by the subjects having the same color and whether the same tracking target is tracked in the tracking process that uses the luminance information and the tracking process that uses the color information. This enables more accurate tracking than when one tracking process is unsuccessful and the result of the other tracking process is simply used.

Figure 10:
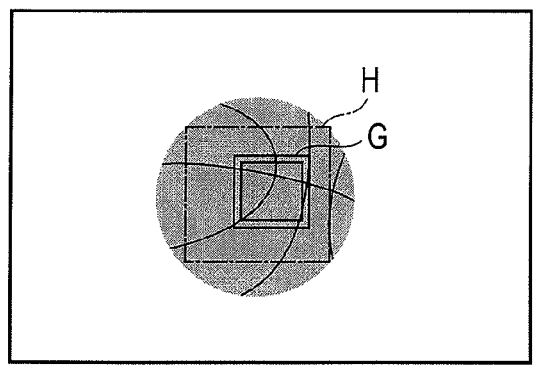
FIG. 10 is a diagram illustrating a tracking process according to a modification of the embodiment of the present invention.

Here, according to the embodiment described above, in order to determine whether the same tracking target is tracked in the tracking process that uses the luminance information and the tracking process that uses the color information, it is determined whether the first candidate tracking position is included in the tracking color region. If the first candidate tracking position and the second candidate tracking position have the same color and the distance between the first candidate tracking position and the second candidate tracking position is small, it can be considered that the same tracking target is tracked in the tracking process that uses the luminance information and the tracking process that uses the color information. Therefore, instead of the determination in S304, a tracking color region H having the same color information as a first candidate tracking position G is detected around the first candidate tracking position G, and whether the second candidate tracking position is included in the tracking color region H is determined, for example, as shown in FIG. 10. This also makes it possible to determine whether the same tracking target is tracked in the tracking process that uses the luminance information and the tracking process that uses the color information.

Whether the same tracking target is tracked in the tracking process that uses the luminance information and the tracking process that uses the color information may be determined by the inclusive relation between the tracking color region obtained from the color information at the first candidate tracking position and the tracking color region obtained from the color information at the second candidate tracking position. In this case, when one of the tracking color regions includes the other, it is determined that the same tracking target is tracked in the tracking process that uses the luminance information and the tracking process that uses the color information.

Although the luminance information and the color information are used for the tracking process in the embodiment described above, face detection may be additionally used for the tracking process. In this case, the result of the face detection is adopted as long as the face detection is possible. When the face detection is impossible, the color information and the luminance information are used together for the tracking process. Other tracking processes such as a tracking process that uses feature amount detection may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tracking apparatus comprising:
a tracking target subject specifying unit configured to specify a tracking target subject included in input image data;
a first tracking position detection unit configured to luminance information from the image data and set, as a first candidate tracking position, the position of the tracking target subject in the image data in accordance with the luminance information;
a second tracking position detection unit configured to detect first color information from the image data and detect, as a second candidate tracking position, the position of the tracking target subject in the image data in accordance with the first color information;
a reference information acquisition unit configured to acquire second color information which is present at the first candidate tracking position; and
a control unit configured to decide a true tracking position in accordance with a determination on whether the first color information and the second color information characteristically correspond to each other and a determination on whether the distance between the first candidate tracking position and the second candidate tracking position is smaller than a predetermined distance;
wherein the control unit sets the first candidate tracking position as the true tracking position, when the distance between the first candidate tracking position and the second candidate tracking position is greater than the predetermined distance, and the control unit sets the second candidate tracking position as the true tracking position, when the distance between the first candidate tracking position and the second candidate tracking position is smaller than the predetermined distance;
the second tracking position detection unit acquires a region having the first color information in the image data, and detects the second candidate tracking position based on the acquired region; and
the control unit determines that the distance between the first candidate tracking position and the second candidate tracking position is smaller than the predetermined distance when the first candidate tracking position is included in the acquired region having the first color information, and the control unit determines that the distance between the first candidate tracking position and the second candidate tracking position is greater than the predetermined distance when the first candidate tracking position is not included in the acquired region having the first color information.

2. The tracking apparatus according to claim 1, wherein the first tracking position detection unit and the second tracking position detection unit detect the first candidate tracking position and the second candidate tracking position in accordance with the true tracking position at the time of a next input of the image data.

3. A tracking method comprising:
causing a tracking target subject specifying unit to specify a tracking target subject included in input image data;
causing a first tracking position detection unit to detect luminance information from the image data and detect, as a first candidate tracking position, the position of the tracking target subject in the image data in accordance with the luminance information;
causing a second tracking position detection unit to detect first color information from the image data and detect, as a second candidate tracking position, the position of the tracking target subject in the image data in accordance with the first color information;
causing a reference information acquisition unit to acquire second color information which is present at the first candidate tracking position; and
causing a control unit to decide a true tracking position in accordance with a determination on whether the first color information and the second color information characteristically correspond to each other and a determination on whether the distance between the first candidate tracking position and the second candidate tracking position is smaller than a predetermined distance;

wherein the control unit sets the first candidate tracking position as the true tracking position, when the distance between the first candidate tracking position and the second candidate tracking position is greater than the predetermined distance, and the control unit sets the second candidate tracking position as the true tracking position, when the distance between the first candidate tracking position and the second candidate tracking position is smaller than the predetermined distance;
the second tracking position detection unit acquires a region having the first color information in the image data, and detects the second candidate tracking position based on the acquired region; and
the control unit determines that the distance between the first candidate tracking position and the second candidate tracking position is smaller than the predetermined distance when the first candidate tracking position is included in the acquired region having the first color information, and the control unit determines that the distance between the first candidate tracking position and the second candidate tracking position is greater than the predetermined distance when the first candidate tracking position is not included in the acquired region having the first color information.

4. A tracking apparatus according to claim 1, further comprising a display element configured to display a tracking frame on a position determined as the true tracking position in the input image.

5. A tracking apparatus according to claim 1, wherein the input image is obtained from an imaging element.

* * * * *